United States Patent
Minami et al.

(10) Patent No.: US 11,533,848 B2
(45) Date of Patent: Dec. 27, 2022

(54) LAWN MOWER

(71) Applicant: HONDA MOTOR CO., LTD., Tokyo (JP)

(72) Inventors: Fumio Minami, Wako (JP); Takuya Matsumoto, Wako (JP); Yoshitaka Oota, Wako (JP); Shota Tanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 281 days.

(21) Appl. No.: 16/917,109

(22) Filed: Jun. 30, 2020

(65) Prior Publication Data

US 2021/0000012 A1   Jan. 7, 2021

(30) Foreign Application Priority Data

Jul. 2, 2019 (JP) .............................. JP2019-123622

(51) Int. Cl.
  *A01D 43/063* (2006.01)
  *A01D 34/68* (2006.01)
  *A01D 101/00* (2006.01)
  *A01D 34/73* (2006.01)

(52) U.S. Cl.
  CPC ........... *A01D 43/063* (2013.01); *A01D 34/68* (2013.01); *A01D 34/73* (2013.01); *A01D 2101/00* (2013.01)

(58) Field of Classification Search
  CPC ...... A01D 43/063; A01D 34/68; A01D 34/73; A01D 2101/00
  USPC ......................................................... 56/16.6
  See application file for complete search history.

(56) References Cited

U.S. PATENT DOCUMENTS

| | | | | |
|---|---|---|---|---|
| 3,987,606 | A * | 10/1976 | Evans | A01D 43/063 56/13.3 |
| 4,118,917 | A * | 10/1978 | Leader | A01D 43/0636 56/DIG. 2 |
| 5,921,072 | A * | 7/1999 | Cargile | A01D 34/005 56/320.2 |
| 6,089,006 | A * | 7/2000 | Langford | A01D 43/077 56/13.3 |
| 6,301,868 | B1 * | 10/2001 | Siplinger | A01D 34/73 56/255 |
| 2014/0182257 | A1 * | 7/2014 | von Rentzell | A01D 34/73 56/289 |
| 2014/0196428 | A1 * | 7/2014 | Shiotsuki | A01D 34/73 56/289 |
| 2018/0177124 | A1 * | 6/2018 | Kuriyagawa | A01D 34/826 |

FOREIGN PATENT DOCUMENTS

JP      2018-102250      7/2018

* cited by examiner

*Primary Examiner* — Mahmoud Gimie
(74) *Attorney, Agent, or Firm* — Rankin, Hill & Clark LLP

(57) ABSTRACT

A lawn mower includes a blade, a motor connected to the blade, and a housing storing the blade in the housing and is configured to mow grass underneath the housing. The lawn mower includes a grass container to contain the mowed grass and a connecting member that connects the housing to the grass container. The housing is provided with a ceiling opening communicating with a flow path inside the connecting member. The ceiling opening overlaps with a region corresponding to a rotation range, of the blade, projected upward along a drive shaft.

6 Claims, 5 Drawing Sheets

LAWN MOWER

INCORPORATION BY REFERENCE

The present application claims priority under 35 U.S.C. § 119 to Japanese Patent Application No. 2019-123622 filed on Jul. 2, 2019. The content of the application is incorporated herein by reference in its entirety.

BACKGROUND OF THE INVENTION

Field of the Invention

The present invention relates to a lawn mower.

Description of the Related Art

Conventionally, lawn mowers that collect mowed grass into a grass container are known (see Japanese Patent Laid-Open No. 2018-102250, for example).

A lawn mower in Japanese Patent Laid-Open No. 2018-102250 is configured to generate whirl winds by rotating a cutter blade and to transport mowed grass to a grass container by causing the whirl winds to flow toward the grass container by using a scroll unit.

SUMMARY OF THE INVENTION

The lawn mower described in Japanese Patent Laid-Open No. 2018-102250 is configured to guide the upward airflows generated by the cutter blade toward the grass container arranged behind a housing, and thus a loss may be caused in air volume or wind speed. Accordingly, there is a demand for more efficient use of the airflows to transport the grass.

In view of the above, it is an object of an aspect of the present invention to provide a lawn mower to mow grass with a blade that is capable of more efficiently use airflows generated by rotation of the blade for transporting the mowed grass.

To achieve the object, an aspect of the present invention provides a lawn mower that includes a blade, a power source connected to the blade, and a housing storing the blade in the housing and is configured to mow grass underneath the housing, the lawn mower including: a grass container to contain the mowed grass; and a connecting member that connects the housing to the grass container. The housing is provided with an opening communicating with a flow path inside the connecting member. The opening overlaps with a region corresponding to a rotation range, of the blade, projected upward along a rotation axis of the blade.

In the above configuration, the blade has a fin that generates an upward airflow due to rotation of the blade.

In the above configuration, the housing is provided with a supporting unit that supports the blade from underneath.

In the above configuration, the power source is arranged underneath the blade, and the supporting unit supports the power source and the blade.

In the above configuration, the power source is an axial gap motor.

In the above configuration, in an upper section of the grass container, an inlet communicating with the flow path inside the connecting member is provided.

The above configuration includes: a container supporting unit that fixes the grass container to the housing, with the inlet side up.

In the above configuration, the power source is installed outside the housing, and the lawn mower includes a power transmission mechanism that transmits motive power of the power source to the blade.

In the above configuration, the power source is installed in such a position within the housing where the power source does not overlap with the region, and the lawn mower includes a power transmission mechanism that transmits motive power of the power source to the blade.

According to an aspect of the present invention, it is possible to more efficiently transport the mowed grass to the grass container, by inhibiting losses of air volume and/or wind speed at the time of sending the air flow generated by the rotation of the blade to the grass container.

DETAILED DESCRIPTION OF THE PREFERRED EMBODIMENTS

The following will describe embodiments to which the present invention is applied, with reference to the drawings.

1. First Embodiment

Figure 1:
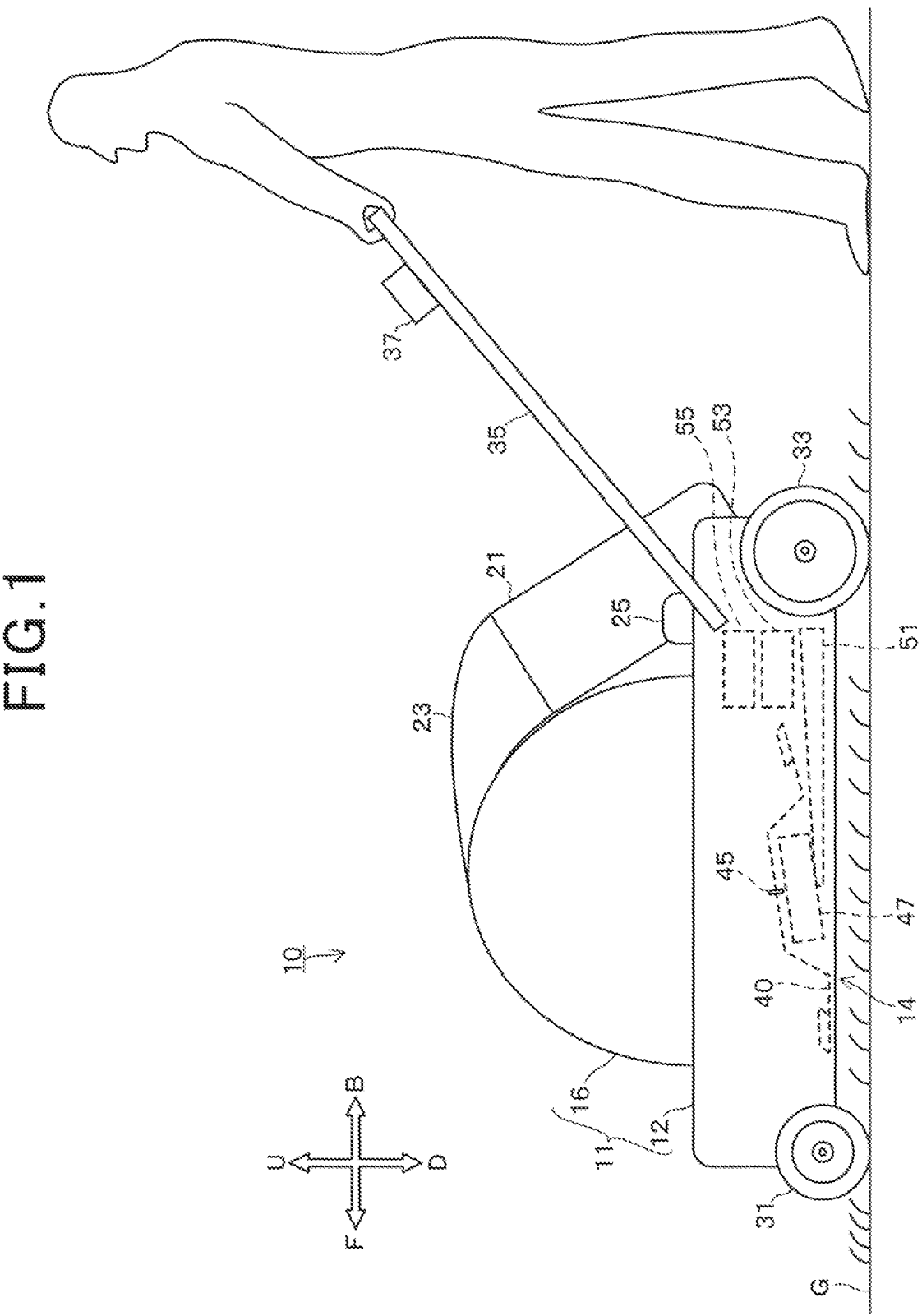
FIG. 1 is a side view showing a configuration of a lawn mower according to a first embodiment.
Figure 3:
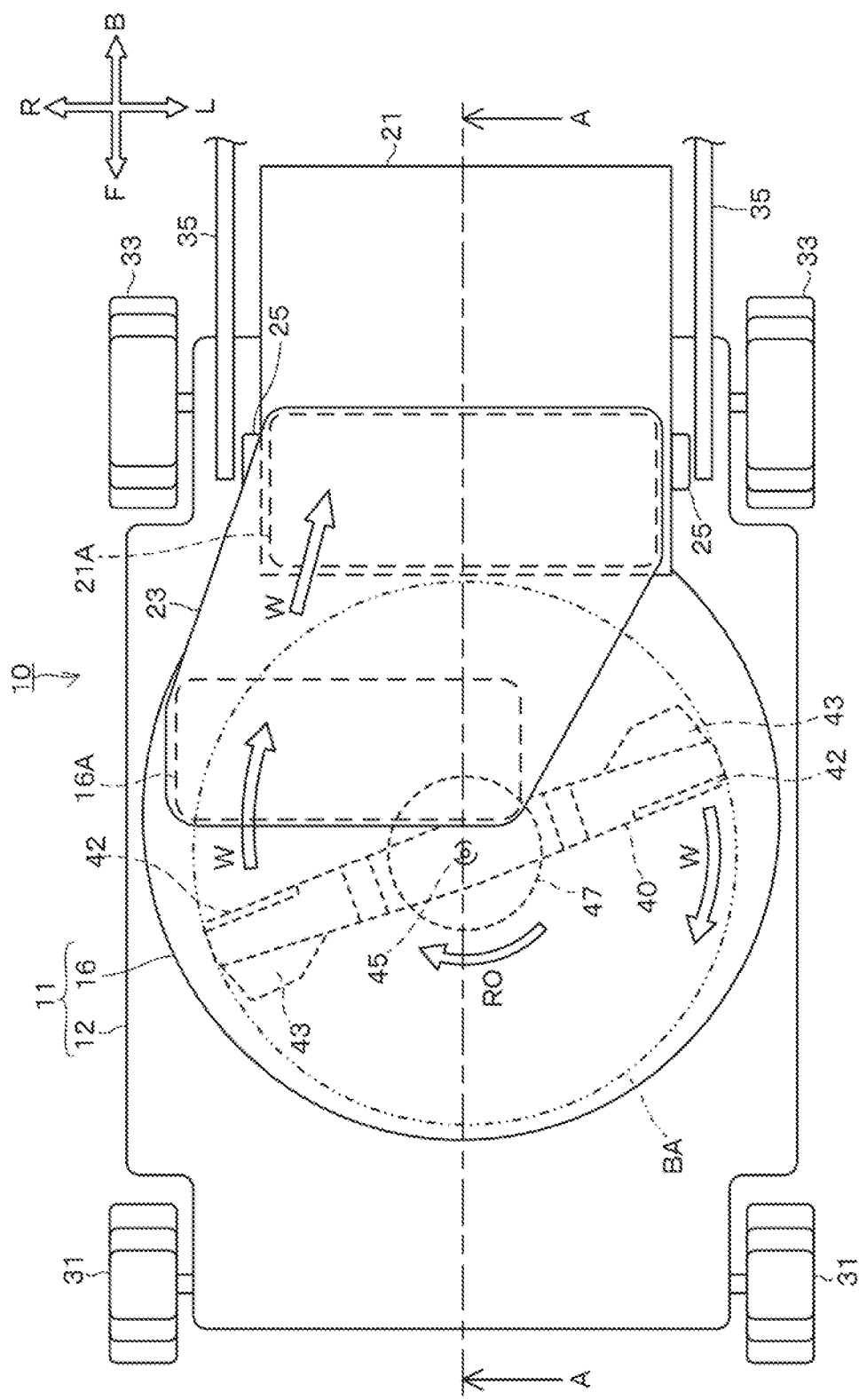
FIG. 3 is a plan view of the lawn mower.
Figure 4:
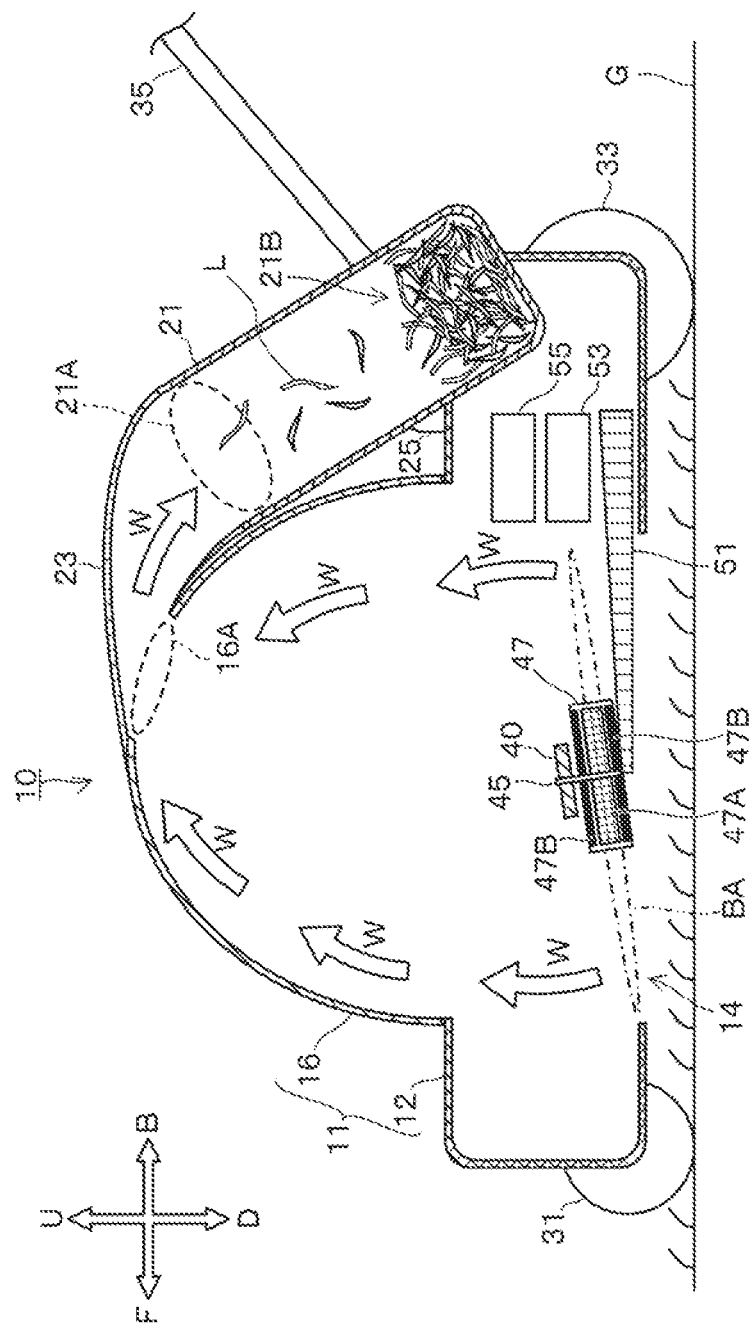
FIG. 4 is a cross-sectional view taken at the line A-A in FIG. 3.

FIG. 1 is a side view of a lawn mower 10 according to a first embodiment. FIG. 3 is a plan view of the lawn mower 10, and FIG. 4 is a cross-sectional view taken at the line A-A in FIG. 3. In the drawings, the directions of front, back, up, down, right, and left while the lawn mower 10 is placed on a ground G will be indicated with the letters F, B, U, D, R, and L, respectively. The letter G in the drawings denotes the ground on which the lawn mower 10 is placed. The directions indicated by the letters F, B, U, D, R, and L denote those directions either in a placement state in which the lawn mower 10 is placed on the ground G or in a working state in which the lawn mower 10 is moving on the ground G.

The lawn mower 10 is a push lawn mower that moves while being pushed by a worker (who may be referred to as an operator or a driver) who mows grass and may be called a walk-behind lawn mower. The lawn mower 10 includes a main body 12; a pair of left-and-right front wheels 31 attached to a front part of the main body 12; and a pair of left-and-right rear wheels 33 attached to a rear part of the main body 12. The main body 12 has attached thereto an operation handle 35 extending rearward. The worker mows grass on the ground G, by gripping the operation handle 35 and walking while pushing the lawn mower 10 forward.

The main body 12 has connected thereto an upper housing 16 that is a dome-shaped hollow member. The main body 12 and the upper housing 16 structure a housing 11. The bottom face of the main body 12 faces the ground G and has a bottom face opening 14 formed therein. Through the bottom face opening 14, a blade 40 arranged in a bottom section of the main body 12 is exposed, so that the blade 40 rotates and mows the grass on the ground G.

A grass container 21 is provided behind the upper housing 16. The grass container 21 is a container to contain the grass mowed by the blade 40 and may be a rigid box made of synthetic resin or metal, or may be a bag made of cloth, non-woven cloth, or a synthetic resin sheet. The grass container 21 in the present embodiment is configured by using a breathable synthetic resin sheet. In the following sections, the grass that has been mowed by the blade 40 will be referred to as mowed grass L.

The grass container 21 is fixed to the main body 12 by a container supporting unit 25. The container supporting unit 25 is, for example, a bracket fixed to the main body 12 and is configured to support either a lateral face of the grass container 21 or a frame (not shown) of the grass container 21.

The lawn mower 10 includes a connecting member 23 that connects the upper housing 16 to the grass container 21. The connecting member 23 is hollow, while the internal space of the connecting member 23 forms a flow path communicating with the inside of the upper housing 16 and with the inside of the grass container 21. It is desirable that the connection part between the upper housing 16 and the connecting member 23 and the connection part between the connecting member 23 and the grass container 21 are joined without any gap, so that none of air flows and the mowed grass L leaks to the outside.

The grass container 21 is detachably attached to the housing 11. In other words, the grass container 21 is detachably fixed to the container supporting unit 25. The connecting member 23 and the grass container 21 are detachably attached to each other. When the grass container 21 is detached from the container supporting unit 25 and from the connecting member 23, the worker is able to dispose of the mowed grass L collected in the grass container 21.

The lawn mower 10 includes a motor 47 as a power source that drives the blade 40. The motor 47 is arranged underneath the blade 40. A stay 51 is connected to the bottom face of the motor 47. The stay 51 is fixed to the main body 12 and supports the motor 47 and the blade 40 from underneath. The stay 51 corresponds to an example of the supporting unit.

To the motor 47, a control circuit 53 and a battery 55 are connected. Under control of the control circuit 53, the battery 55 supplies electric power for driving the motor 47. The control circuit 53 rotates/stops the motor 47, by turning on/off the electric power supply to the motor 47 in response to operations performed on a switch 37 provided to the operation handle 35.

In this situation, the control circuit 53 and the battery 55 may be provided on the outside of the main body 12. Further, although the example in which the electric power is supplied from the battery 55 to the control circuit 53 is explained in the present embodiment, it is also acceptable, for example, to supply electric power from a commercial alternate current power source to the control circuit 53.

The blade 40 is fixed to a drive shaft 45 directly connected to an output shaft of the motor 47 and rotates due to motive power of the motor 47.

Figure 2:
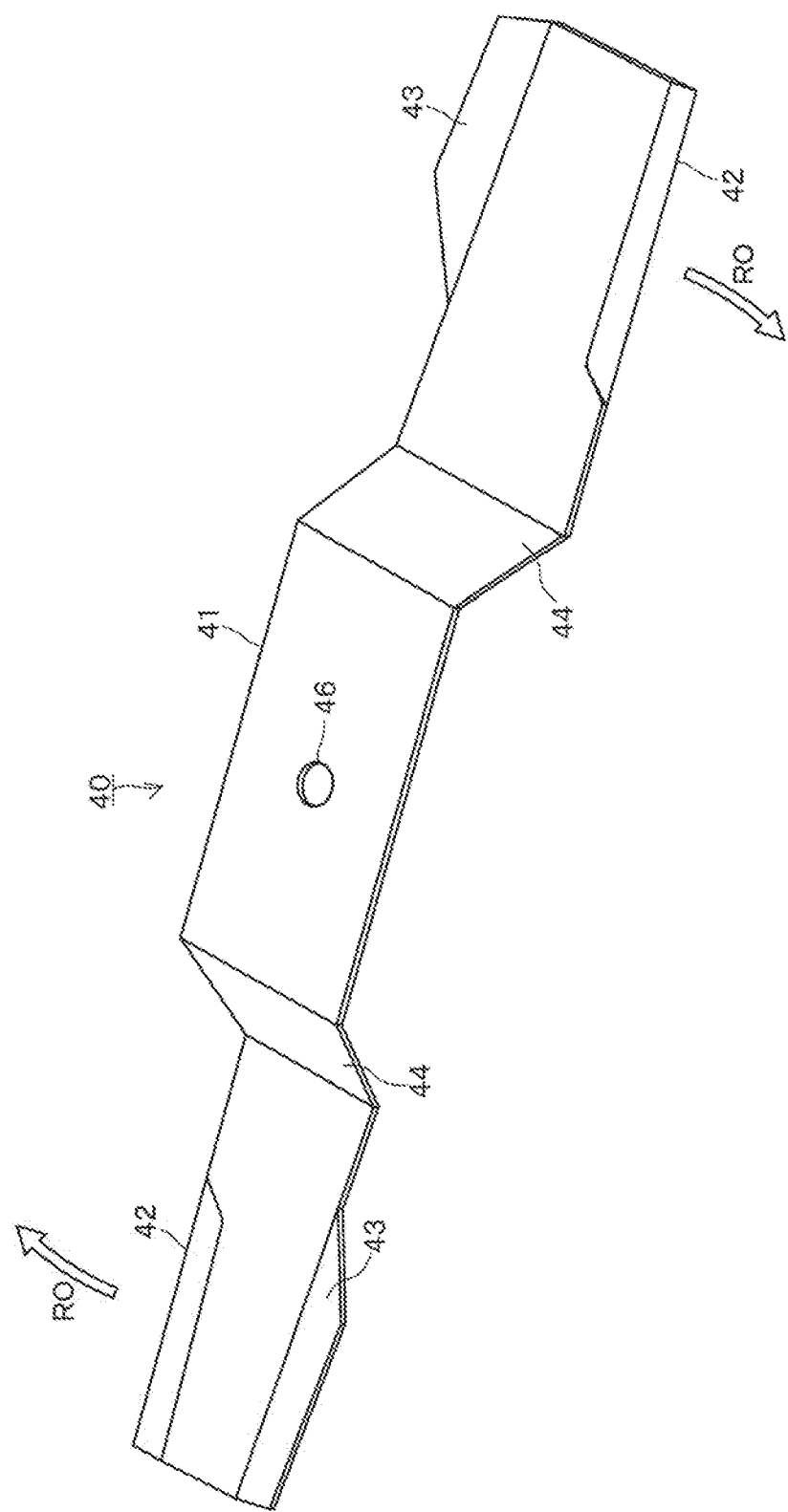
FIG. 2 is a perspective view of a blade of the lawn mower.

FIG. 2 is a perspective view of the blade 40.

The blade 40 has a blade main body 41 configured with a metal plate, for example. The blade main body 41 has edge parts 42 and fins 43 formed therewith. At the center of the blade main body 41, a shaft attachment part 46 is formed, so that the drive shaft 45 is fixed to the shaft attachment part 46. The blade 40 rotates on the shaft attachment part 46 in the direction indicated with the reference characters "RO" in the drawings.

The edge parts 42 are the ends of the blade main body 41 positioned on the RO side and are sharpened. When the blade 40 rotates on the drive shaft 45 in the rotation direction RO, the edge parts 42 hit and cut the grass. The fins 43 are wing-like parts formed on the opposite side from the edge parts 42 in terms of the rotation direction RO of the blade 40. While the blade 40 is installed, the fins 43 are raised from the plane of the blade main body 41. The fins 43 generate upward airflows, in conjunction with the rotation of the blade 40.

In the blade main body 41, a stepped part 44 is formed between the plane in which the shaft attachment part 46 is formed and the plane on which the edge parts 42 are formed. In other words, the blade main body 41 has a stepped shape so that the levels of the edge parts 42 and the shaft attachment part 46 are different. Accordingly, while the edge parts 42 are positioned close to the ground G, a space is kept underneath the shaft attachment part 46, so that the motor 47 can be arranged in the space. In other words, by designing the blade main body 41 to have the stepped shape with the stepped part 44, it is possible to have the motor 47 stored underneath the blade main body 41.

Because the motor 47 is stored in the space underneath the blade main body 41, it is desirable that the motor 47 has a low profile. In the present embodiment, a preferable example will be explained in which the motor 47 is configured with an axial gap motor. In the present example, as shown in FIG. 4, the motor 47 includes a rotor 47A connected to the drive shaft 45 and a stator 47B, and has a three-dimensional magnetic circuit in which the rotor 47A and the stator 47B face each other in the axial direction of the drive shaft 45 for achieving rotation. The axial gap motor has a characteristic where the size thereof in the axial direction of the drive shaft 45 is smaller compared to radial motors.

When the blade 40 rotates due to the motive power of the motor 47, airflows are generated by the fins 43 in the housing 11. The directions of the airflows generated by the blade 40 are indicated with the reference character "W" in FIGS. 3 and 4. As shown in FIG. 3, the airflows generated by the blade 40 include whirl winds that are in the same direction as the rotation direction RO of the blade 40.

The airflows generated by the blade 40 include rising airflows as shown in FIG. 4. The rising airflows have the effect of raising the grass on the ground G and facilitating the cutting by the blade 40. Further, due to the rising airflows generated by the blade 40, the mowed grass L is transported upward on the inside of the housing 11.

In an upper section of the upper housing 16, a ceiling opening 16A is formed. The ceiling opening 16A is an opening that, in a joint part between the upper housing 16 and the connecting member 23, connects the internal space of the upper housing 16 to the flow path inside the connecting member 23. The ceiling opening 16A is positioned higher than the middle in terms of the height direction of the upper housing 16 and preferably opens either at the top or at the vicinity of the top of the upper housing 16. The mowed grass L is transported by the rising airflows to the upper section of the upper housing 16 and flows into the connecting member 23 through the ceiling opening 16A.

In FIG. 3, the virtual line (the two-dot chain line) indicates a range obtained by projecting a rotation range BA of the blade 40 along the drive shaft 45, which is the rotation axis of the blade 40. Because the ceiling opening 16A overlaps with the rotation range BA, resistance occurring when the rising airflows inside the upper housing 16 flow into the connecting member 23 is small, which makes it possible to efficiently guide the airflows into the connecting member 23. Accordingly, it is possible to transport the mowed grass L from the housing 11 to the connecting member 23, by efficiently using the energy with which the motor 47 rotates the blade 40.

FIG. 3 shows the configuration in which a part of the ceiling opening 16A overlaps with the rotation range BA; however, the ceiling opening 16A may be included in the rotation range BA, or the ceiling opening 16A may include the rotation range BA.

In the example in FIG. 3, the ceiling opening 16A is formed in a position offset with respect to the drive shaft 45. More specifically, the ceiling opening 16A is formed in such a position that there is a large area opposing the airflow directions W. Consequently, it is possible to more efficiently cause the airflows including the whirl winds in the RO direction to flow into the connecting member 23 through the ceiling opening 16A.

Further, in an upper section of the grass container 21, an upper opening 21A is formed. The upper opening 21A is an opening that, in a joint part between the grass container 21 and the connecting member 23, connects the internal space of the grass container 21 to the flow path inside the connecting member 23 and serves as an inlet through which the mowed grass L flows into the grass container 21. The upper opening 21A is positioned higher than the middle in terms of the height direction of the grass container 21 and preferably opens either at the topmost part of the grass container 21 or at the vicinity thereof. The mowed grass L goes through the flow path of the connecting member 23 and flows to the inside of the grass container 21 through the upper opening 21A. Consequently, an advantageous effect is achieved where the grass container 21 can be filled with the mowed grass L with a high filling ratio.

For example, if mowed grass were forwarded into a grass container by airflows in horizontal directions like in the lawn mower disclosed in Japanese Patent Laid-Open No. 2018-102250, it would be difficult to fill the grass container with the mowed grass up to the upper section thereof. Accordingly, there has been a demand that filling ratios of grass containers with mowed grass be increased.

The lawn mower 10 according to the present embodiment is configured so that the mowed grass L flows into the grass container 21 through the upper opening 21A and accumulates in a bottom part 21B of the grass container 21. Accordingly, it is possible to accumulate the mowed grass L in the grass container 21, with a high filling ratio without voids. Increasing the filling ratio of the grass container 21 lowers the frequency of the work to discard the mowed grass L accumulating in the grass container 21 and thus enhances workability. Further, it is advantageously possible to reduce the size of the grass container 21 without lowering the collecting capability for the mowed grass L.

As explained above, the lawn mower 10 according to the first embodiment includes the blade 40, the motor 47 connected to the blade 40, and the housing 11 storing the blade 40 in the housing 11 and is configured to mow the grass on the ground G underneath the housing 11. The lawn mower 10 includes the grass container 21 to contain the mowed grass L and the connecting member 23 that connects the housing 11 to the grass container 21. The housing 11 is provided with the ceiling opening 16A communicating with the flow path inside the connecting member 23. The ceiling opening 16A overlaps with the region corresponding to the rotation range BA, of the blade 40, projected upward along the drive shaft 45 of the blade 40.

As a result, in the process of guiding the airflows generated by the rotation of the blade 40 to the connecting member 23, it is possible to more efficiently transport the mowed grass L to the grass container 21 by inhibiting losses of air volume and/or wind speed.

In the lawn mower 10, the blade 40 has the fins 43 that generate the upward airflows due to the rotation of the blade 40. As a result, with the rising airflows generated in conjunction with the rotation of the blade 40, it is possible to have the mowed grass L guided to the upper section of the housing 11 and transported to the grass container 21.

In the housing 11, the lawn mower 10 includes the stay 51 supporting the blade 40 from underneath. With this configuration, it is possible to support the blade 40 by using the member positioned so as not to overlap with the flow path of the rising airflows generated by the blade 40. Consequently, because the airflows transporting the mowed grass L are not obstructed, it is possible to more efficiently transport the mowed grass L to the grass container 21.

Further, in this configuration, because the stay 51 is not positioned on the transport path of the mowed grass L mowed by the blade 40, the mowed grass L does not easily adhere to the stay 51. Consequently, it is possible to do away with, or minimize the frequency of, the work to get rid of the mowed grass L adhering to the stay 51. It is therefore possible to reduce the labor required in maintenance of the lawn mower 10.

In the lawn mower 10, the motor 47 is arranged underneath the blade 40, while the stay 51 supports the motor 47 and the blade 40. Accordingly, it is possible to support the blade 40 and the motor 47 driving the blade 40, by using the structure that does not obstruct the airflows. Consequently, it is possible to more efficiently transport the mowed grass L to the grass container 21.

The motor 47 may be an axial gap motor. By using the axial gap motor, which is thinner than radial motors, it is possible to easily have the motor 47 stored underneath the blade 40. Accordingly, it is possible to realize a structure in which the stay 51 supports the blade 40 and the motor 47, while avoiding an increase in the size of the lawn mower 10.

In the lawn mower 10, the upper opening 21A communicating with the flow path inside the connecting member 23 is provided in the upper section of the grass container 21. Accordingly, because the mowed grass L is put into the grass container 21 from the upper section of the grass container 21, it is possible to increase the filling ratio of the grass container 21. As a result, it is possible to enhance convenience by reducing the frequency of the work to remove the mowed grass L from the grass container 21. Further, it is possible to keep the grass container 21 compact, without reducing the storing capability for the mowed grass L.

The lawn mower 10 includes the container supporting unit 25 that fixes the grass container 21 to the housing 11, with the upper opening 21A side up. Because the container supporting unit 25 is able to fix the grass container 21 to the main body 12, with such an orientation in which the upper opening 21A side is up, it is possible to pack the grass container 21 with the mowed grass L, efficiently and with a high filling ratio.

2. Second Embodiment

Figure 5:
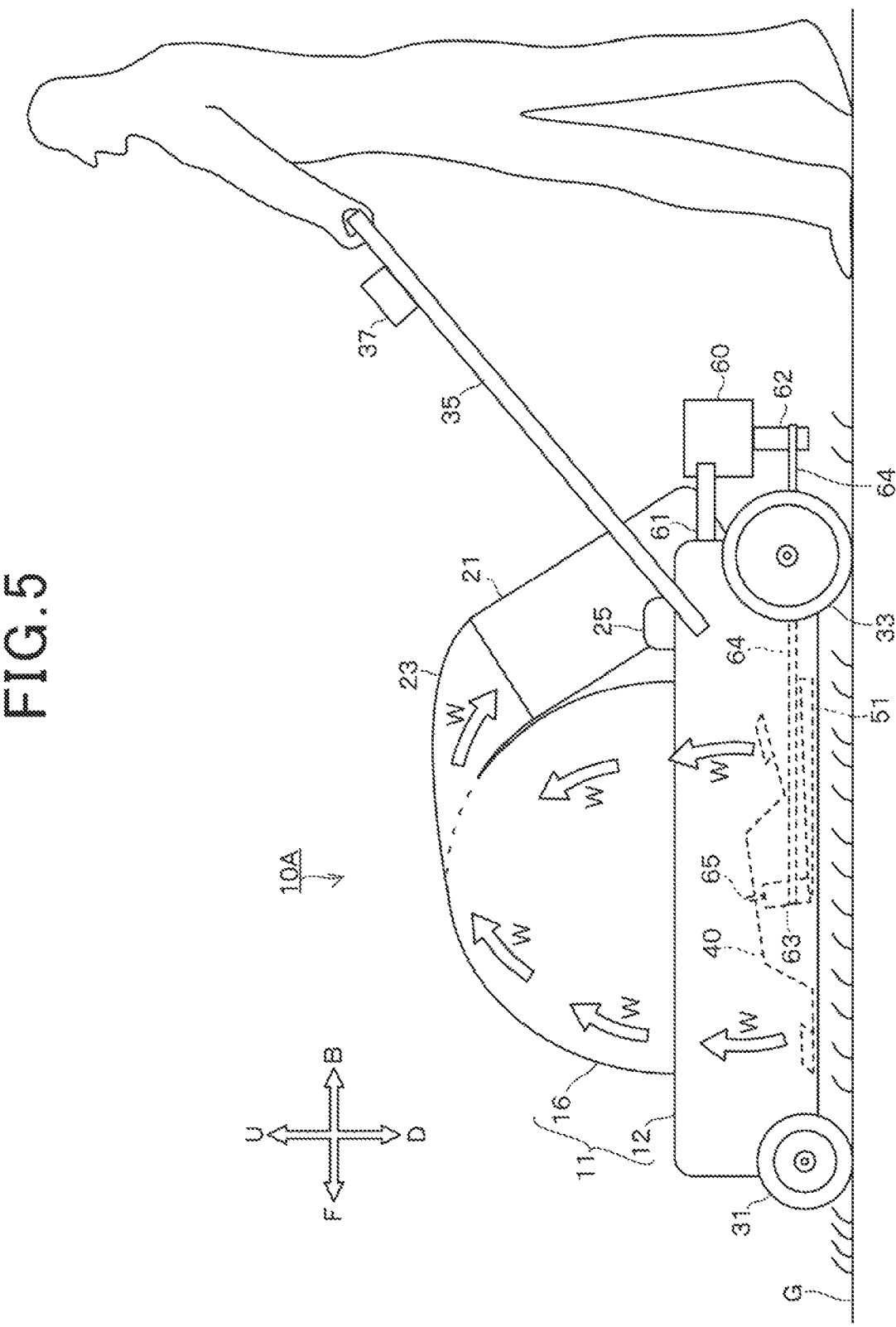
FIG. 5 is a side view showing a configuration of a lawn mower according to a second embodiment.

FIG. 5 is a side view showing a configuration of a lawn mower 10A according to a second embodiment.

Similarly to the lawn mower 10 described in the first embodiment, the lawn mower 10A is a push lawn mower operated while a worker pushes the operation handle 35. Some of the constituent elements of the lawn mower 10A that are the same as those of the lawn mower 10 will be referred to by using the same reference characters, and the explanations thereof will be omitted.

The lawn mower 10A includes a power source 60 as a power source that drives the blade 40. For example, the power source 60 is configured with an axial gap motor like the motor 47, a radial motor, or an engine. In the lawn mower 10A, a control device (not shown) brings the power source 60 into operation according to operations performed on the switch 37.

When an engine is used as the power source 60, the lawn mower 10A may include, together with the power source 60, a fuel tank, a fuel supply device, an intake/exhaust device, and/or the like; however, these elements are omitted from the drawing.

As another example, when a motor is used as the power source 60, the lawn mower 10A may include a battery that supplies electric power to the power source 60 and/or a control circuit; however, these elements are omitted from the drawing.

The power source 60 is fixed to the main body 12 by a bracket 61. FIG. 5 illustrates an example in which the power source 60 is installed behind the main body 12. However, the position of the power source 60 is not particularly limited, and the power source 60 may be installed to the front or above the main body 12.

The power source 60 has an output shaft 62 that outputs a rotation force. The output shaft 62 is connected to a blade driving unit 63 by a power transmission mechanism 64. For example, the power transmission mechanism 64 has a mechanical structure including a belt, a gear, and a link, among others and is configured to transmit the rotation of the output shaft 62 to the blade driving unit 63.

The blade driving unit 63 has a drive shaft 65 that outputs the rotation force transmitted thereto by the power transmission mechanism 64. The drive shaft 65 is fixed to the blade 40. The blade 40 is supported by the blade driving unit 63. The blade driving unit 63 is supported by the stay 51 from underneath. In other words, the stay 51 is fixed to the main body 12 and functions as a supporting unit that supports the blade driving unit 63 and the blade 40 from underneath.

In this configuration, when the power source 60 rotates the output shaft 62, the blade 40 rotates together with the drive shaft 65 so that, similarly to the lawn mower 10, the blade 40 generates airflows including rising airflows and whirl winds.

Similarly to the lawn mower 10, in the lawn mower 10A, the airflows generated by the blade 40 are guided to the grass container 21 through the ceiling opening 16A, so that it is possible to collect the mowed grass L into the grass container 21 by using the airflows.

Accordingly, it is possible to efficiently collect the mowed grass L by using the airflows generated by the blade 40. Further, it is possible to increase the filling ratio of the grass container 21 to contain the mowed grass L.

Further, in the lawn mower 10A, the power source 60 is provided on the outside of the housing 11, and the motive power generated by the power source 60 can be transmitted to the blade 40 by the power transmission mechanism 64. Accordingly, even when the power source 60 is not particular compact, it is possible to install the power source 60 in such a position that the airflows generated by the blade 40 are not obstructed. For example, for the lawn mower 10A, it is possible to install, as the power source 60, an engine requiring an intake/exhaust system or a large motor that may be difficult to be stored in the space underneath the blade 40. Consequently, the lawn mower 10A has an advantageous effect where the type of the power source 60 is not limited to compact power sources such as axial gap motors.

3. Other Embodiments

The embodiments described above are merely modes of certain embodiments of the present invention. It is possible to arbitrarily modify or implement adaptive use to any of the embodiments, without departing the gist of the present invention.

For example, in the lawn mower 10 described in the first embodiment, the blade 40 may be arranged underneath the stay 51. More specifically, possible configurations include one in which the motor 47 is installed underneath the stay 51, so that the drive shaft 45 protrudes downward from the motor 47, while the blade 40 is fixed to the drive shaft 45. In this situation, the blade 40 may be a plate-like member that is without the stepped part 44 and is flat or warped. With this configuration, similarly to the first embodiment, it is possible to transport the mowed grass L mowed by the blade 40, by blowing and lifting up the mowed grass L to the inside of the housing 11 with the fins 43, which is expected to exert the same advantageous effects. Further, in this configuration, because the stay 51 is positioned on the path by which the mowed grass L mowed by the edge parts 42 is transported, there is a possibility that the mowed grass L may adhere to the stay 51. However, by adjusting the cross-sectional shape and/or the width of the stay 51, it is possible to inhibit the adhesion of the mowed grass L. Further, in this configuration, because there is no need to have the motor 47 stored in the stepped part 44 of the blade 40, it is acceptable to use a radial motor as the motor 47, besides the axial gap motor.

Further, the lawn mower 10 and the lawn mower 10A may be configured so that the blade 40 does not have the stepped part 44. In other words, even by using the blade 40 that does not have the stepped part 44, it is possible to arrange the blade main body 41 to reach a position where mowing the grass through the bottom face opening 14 is possible. For example, by adjusting the tilt angle of the drive shaft 45 with respect to a horizontal plane while the lawn mower 10 is in a placement or used state and/or the length of the blade 40, it is possible to realize a configuration in which the blade main body 41 is positioned close to the ground G.

In that situation, the blade 40 may be in the shape of a flat plate or may have a curved part forming a recess in the vicinity of the drive shaft 45 similarly to the stepped part 44.

Further, in the lawn mower 10A described in the second embodiment, the power source 60 is provided on the outside of the housing 11; however, the present invention is not limited to this configuration. For example, another configuration is also acceptable in which a power source is provided inside the housing 11, so that motive power is transmitted from the power source to the blade 40 by a power transmission mechanism. In that situation, the power transmission mechanism may have the same or similar configuration as that of the power transmission mechanism 64. The power source may be, for example, a motor that operates with electric power from the battery 55. In this configuration, it is preferable to further arrange the power source to be positioned within the housing 11 so as not to overlap with a region corresponding to the rotation range BA, of the blade 40, projected upward along the drive shaft of the blade 40. In other words, it is preferable to position the power source outside of the region. In this configuration, because the power source does not obstruct the transport of the mowed grass L, an advantageous effect is achieved where it is possible to more efficiently transport the mowed grass L to the grass container 21.

Further, for example, the lawn mowers 10 and 10A may be configured to be able to switch between a bagging mode in which the mowed grass L is contained in the grass container 21 and a mulching mode in which the mowed grass L is chopped up in smaller pieces in the housing 11 before being ejected through the bottom face opening 14. More specifically, the configuration may include a flap that opens and closes the ceiling opening 16A and an open/close mechanism that operates the flap. In that situation, in the bagging mode, the mowed grass L is immediately collected into the grass container 21 due to the airflows generated by the blade 40, as explained in the embodiments above. In contrast, in the mulching mode, because the ceiling opening 16A is closed by the flap, the mowed grass L circulates inside the housing 11 due to the airflows generated by the blade 40. In this situation, because of the rising airflows and the whirl winds generated by the blade 40, the mowed grass L whirls around while being blown and lifted upward. Accordingly, because the mowed grass L widely circulates all over the internal space of the housing 11, it is expected that the mowed grass L will be finely dispersed and fall to the ground G without forming large lumps. Further, it is expected that individual pieces of the mowed grass L will finely be cut up while circulating inside the housing 11. Consequently, also in the mulching mode, it is possible to efficiently use the airflows generated by the blade 40.

The lawn mowers 10 and 10A may be provided, on the inside of the housing 11, with an air guiding part that guides the airflows to the opening. For example, on the inner face of the upper housing 16, a scroll-shaped rib extending along the rotation direction RO of the blade 40 may be provided as the air guiding part. In that situation, because it is possible to guide the airflows generated by the blade 40 to the connecting member 23 in an eddy, an advantageous effect is expected where the airflows move more smoothly. Further, another advantageous effect is also expected where the airflows are prevented from having collisions and turbulence inside the housing 11. Consequently, attenuation in air volume and/or wind speed does not easily occur in the airflows moving from the housing 11 to the grass container 21. It is therefore possible to more efficiently use the airflows generated by the blade 40.

Further, the positions of the control circuit 53 and the battery 55 are not limited to those shown in FIGS. 1 and 4 and may arbitrarily be changed. It is, however, desirable to select positions where the airflows generated by the blade 40 are not obstructed. Further, in the lawn mowers 10 and 10A, it is acceptable to provide a partition wall that separates the space in which the airflows generated by the blade 40 move, from the space in which the control circuit 53 and the battery 55 are arranged.

Further, applications of the present invention are not limited to the push lawn mowers 10 and 10A. For example, the present invention may be applied to a self-propelled lawn mower including a seat in which a user rides and a drive source for travelling and being configured to travel according to maneuvers of the user. Further, the present invention is also applicable to an autonomous-travel lawn mower having a travel-purpose drive source.

10, 10A lawn mower
11 housing
12 main body
14 bottom face opening
16 upper housing
16A ceiling opening (opening)
21 grass container
21A upper opening (inlet)
21B bottom part
23 connecting member
25 container supporting unit
31 front wheels
33 rear wheels
35 operation handle
37 switch
40 blade
41 blade main body
42 edge part
43 fin
44 stepped part
45 drive shaft
46 shaft attachment part
47 motor (power source)
47A rotor
47B stator
51 stay (supporting unit)
53 control circuit
55 battery
60 power source
61 bracket
62 output shaft
63 blade driving unit
64 power transmission mechanism
65 drive shaft

What is claimed is:

1. A lawn mower that includes a blade, a power source connected to the blade, and a housing storing the blade in the housing and is configured to mow grass underneath the housing, the lawn mower comprising:
   a grass container to contain the mowed grass; and
   a connecting member that connects the housing to the grass container, wherein
   the housing is provided with an opening communicating with a flow path inside the connecting member,
   the opening overlaps with a region corresponding to a rotation range, of the blade, projected upward along a rotation axis of the blade,
   the housing is provided with a supporting unit that supports the blade from underneath, and
   the power source is arranged underneath the blade, and the supporting unit supports the power source and the blade.

2. The lawn mower according to claim 1, wherein the blade has a fin that generates an upward airflow due to rotation of the blade.

3. The lawn mower according to claim 1, wherein the power source is an axial gap motor.

4. The lawn mower according to claim 1, wherein in an upper section of the grass container, an inlet communicating with the flow path inside the connecting member is provided.

5. The lawn mower according to claim 4, comprising a container supporting unit that fixes the grass container to the housing, with the inlet side up.

6. The lawn mower according to claim 1, wherein
   the power source is positioned within the housing so as not to overlap with the region, and
   the lawn mower comprises a power transmission mechanism that transmits motive power of the power source to the blade.

* * * * *